United States Patent
Iijima

(10) Patent No.: US 7,667,744 B2
(45) Date of Patent: Feb. 23, 2010

(54) IMAGE PICKUP APPARATUS AND METHOD OF CONTROLLING SAME

(75) Inventor: Ryunosuke Iijima, Ebina (JP)

(73) Assignee: Canon Kabushiki Kaisha, Tokyo (JP)

(*) Notice: Subject to any disclaimer, the term of this patent is extended or adjusted under 35 U.S.C. 154(b) by 531 days.

(21) Appl. No.: 11/301,163

(22) Filed: Dec. 12, 2005

(65) Prior Publication Data

US 2006/0139477 A1    Jun. 29, 2006

(30) Foreign Application Priority Data

Dec. 24, 2004  (JP)  ............... 2004-374767

(51) Int. Cl.
H04N 5/262 (2006.01)

(52) U.S. Cl. ............................................. 348/239

(58) Field of Classification Search ............... 348/239, 348/576–588, 207.99, 595; 352/44, 85, 91 C, 352/91 R
See application file for complete search history.

(56) References Cited

U.S. PATENT DOCUMENTS

| 4,181,410 | A  | * | 1/1980  | Sicha et al. ............... 352/91 R |
| 4,305,131 | A  | * | 12/1981 | Best ............................. 715/716 |
| 5,600,370 | A  | * | 2/1997  | Furuyama ..................... 348/239 |
| 6,236,802 | B1 | * | 5/2001  | Yamamoto ...................... 386/52 |
| 6,301,429 | B1 | * | 10/2001 | Hirosawa ....................... 386/53 |
| 6,546,187 | B1 | * | 4/2003  | Miyazaki et al. ............... 386/52 |
| 2002/0008764 | A1 | * | 1/2002 | Nakayama .................... 348/239 |
| 2002/0012522 | A1 | * | 1/2002 | Kawakami et al. ............ 386/52 |
| 2005/0007332 | A1 | * | 1/2005 | Eiden et al. .................. 345/102 |
| 2005/0018050 | A1 | * | 1/2005 | Yaji et al. .............. 348/207.99 |

FOREIGN PATENT DOCUMENTS

| JP | H04-334178 | 11/1992 |
| JP | H08-331447 | 12/1996 |

* cited by examiner

Primary Examiner—Lin Ye
Assistant Examiner—Euel K Cowan
(74) Attorney, Agent, or Firm—Cowan, Liebowitz & Latman, P.C.

(57) ABSTRACT

In a period of time during which an image effect is being selected, a synthesized image in which the selected image effect is synthesized to an input image is generated and the operation of the image effect of the synthesized image is automatically and repeatedly displayed, thereby allowing the user to check what kind of operation the currently-selected fade function is before recording.

17 Claims, 6 Drawing Sheets

FADE-OUT OPERATION

PREVIEW OF FADE-IN AND FADE-OUT

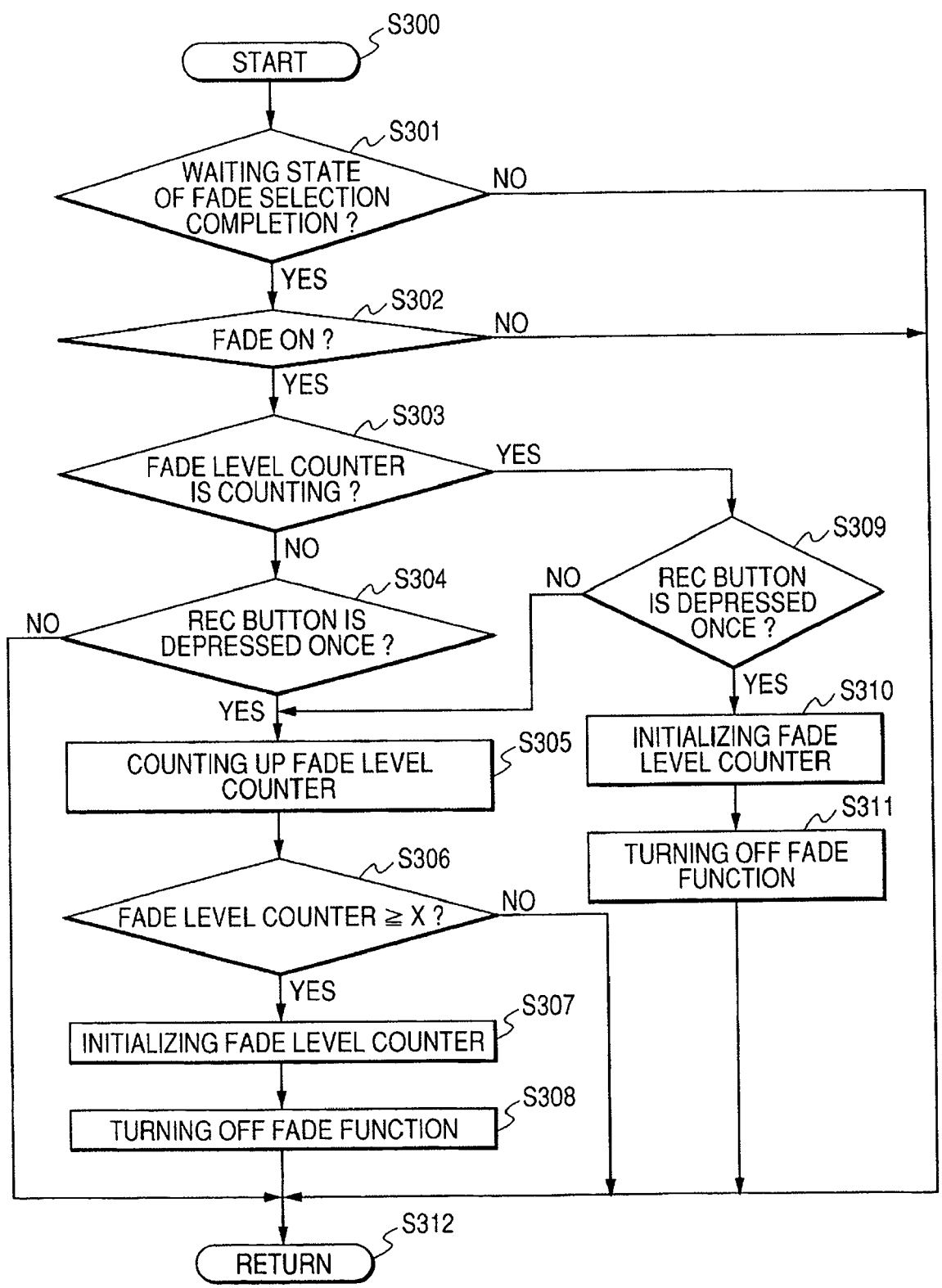

IMAGE PICKUP APPARATUS AND METHOD OF CONTROLLING SAME

BACKGROUND OF THE INVENTION

1. Field of the Invention

The present invention relates to an image pickup apparatus and a method of controlling the same, and relates to for example, a technique that is suitable when used in controlling the image pickup apparatus such as a video camera having a function of performing image effect of fade processing and the like on a recording signal or a reproduced signal.

2. Related Background Art

Conventionally, as an image effect, fade effects such as fade-in in which the entire screen first gradually appears on the imaging screen from a white screen or a black screen as time passes and then the entire image which is being output from image pickup element (through image) appears, and a fade-out in which the through image first appears and gradually changes to end in the white screen or the black screen as time passes are known.

Such fade function includes a function in which the fade-in operation is not performed until the recording medium is set in the camera main body, the fade function selected by the user from a plurality of fade functions is set to an enabled state, and the photographed image is recorded.

However, conventionally, since the image effect process of fade, wipe and the like selected by the user is performed only after the recording medium such as tape is inserted and the photographed image is recorded, the operation of fade effect selected before photograph recording could not be checked. Thus, it was difficult to determine which effect carries out what kind of operation, when the image effect is selected, and the image photographed using the fade effect the user did not intend may be recorded.

When the image effect process such as the selected fade, wipe and the like is applied during recording, a series of image effect operations are performed in real time during photographing, and thus it takes a long time until the user is able to check the operation of the selected image effect.

Further, in order to check the operation of the image effect, the actual recordation must be performed, and the procedures of selecting and setting a desired effect from a plurality of actual image effects and then recording must be carried out, and thus it takes a long time until a desired fade function is selected and thus the photographer may miss an important scene.

According to the present invention, the check on what kind of operation the fade function currently selected performs can be made in a short period of time.

SUMMARY OF THE INVENTION

An image pickup apparatus according to a first embodiment of the present invention includes image input unit which inputs an image; image effect selection unit which selects an arbitrary image effect; synthesized image generation unit which generates a synthesized image in which the selected image effect is synthesized to the image input by the image input unit; and controlling unit which, when the arbitrary image effect is selected by the image effect selection unit, effects control so as to automatically and repeatedly display the operation of the image effect of the synthesized image in a period of time during which the image effect is being selected.

As configured above, the photographer is able to check, before recording, the operation of the image effect such as fade function or the like that is currently being selected and thus is able to rapidly and easily perform the selection of the desired image effect.

According to another embodiment of the present invention, a method of controlling an image pickup apparatus comprises: an image input step for inputting an image; an image effect selection step for selecting an arbitrary image effect; an image effect synthesis step for synthesizing the image effect to the image input in the image input step; and a controlling step for, when the arbitrary image effect is selected by the image effect selection step, effecting control so as to automatically and repeatedly display the selected image effect operation in a period of time during which the image effect is being selected.

Further, according to another embodiment, a program for causing a computer to execute a method of controlling an image pickup apparatus can be provided, the method comprising: an image input step for inputting an image; an image effect selection step for selecting an arbitrary image effect; an image effect synthesis step for synthesizing the image effect to the image input in the image input step; and a controlling step for, when the arbitrary image effect is selected by the image effect selection step, effecting control so as to automatically and repeatedly display the selected image effect operation in a period of time during which the image effect is being selected.

Further, according to another embodiment, a storage medium computer-readably stores the above-described computer program is recorded.

Other aims and features of the present invention will be apparent from the following description and the accompanying drawings.

BRIEF DESCRIPTION OF THE DRAWINGS

FIG. 5 is a flow chart explaining the operation of the system controller during recording.

DETAILED DESCRIPTION OF THE PREFERRED EMBODIMENTS

First Embodiment

Figure 1:
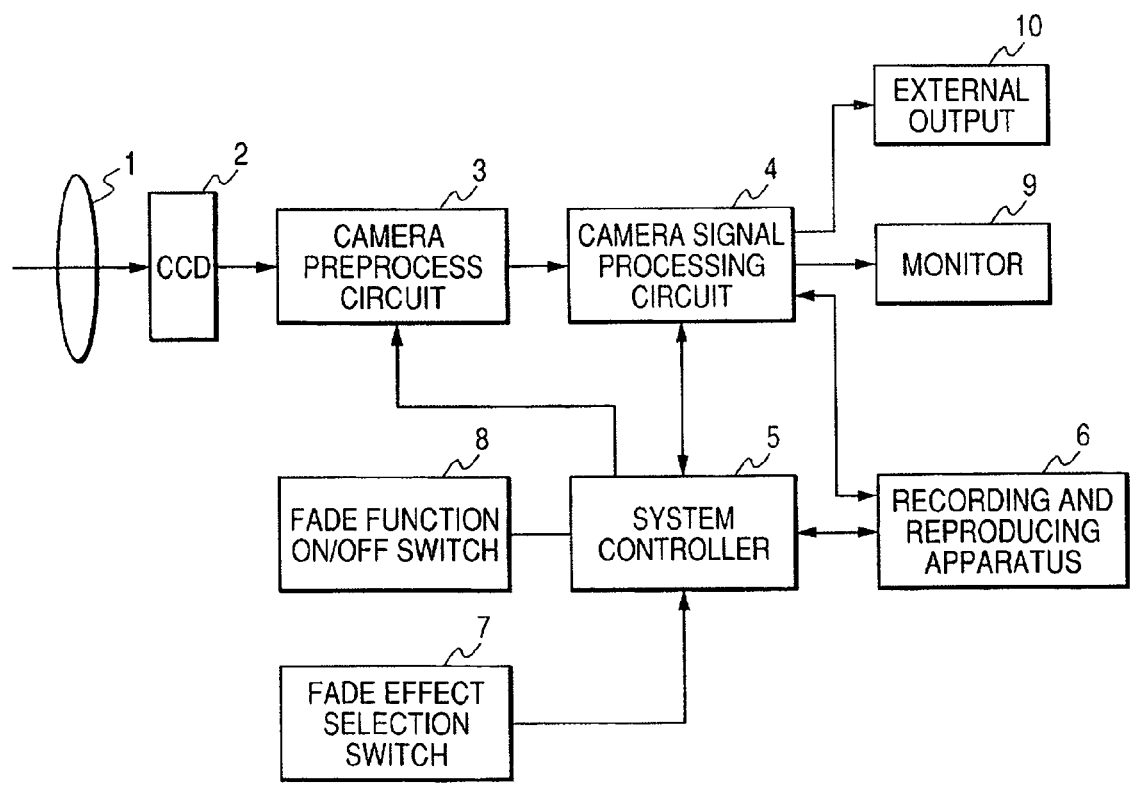
FIG. 1 is a block diagram explaining a configuration example of an image pickup apparatus.

FIG. 1 shows one example of an image pickup apparatus of the present invention.

In FIG. 1, the reference numeral 1 is a lens for performing focusing and zooming operations. The light that has passed through the lens 1 is imaged on the imaging plane of a CCD 2 of an image pickup element and photoelectrically converted to an electric signal by the CCD 2. The photoelectrically converted imaging signal is read from the CCD 2 by the reference clock, and sampled/held at a camera pre-process circuit 3. Simultaneously, the signal is controlled to a suitable gain by the system controller 5 and then A/D converted.

In the camera pre-process circuit 3, the A/D converted image signal is then sent to a camera signal processing circuit 4. In the camera signal processing circuit 4, various signal processes are performed on the input image signal to generate the image data.

A system controller 5 is controlling means for controlling the entire image pickup apparatus. A recording and reproducing apparatus 6 is an apparatus for recording the image data output from the camera signal processing circuit 4 on a recording medium (not shown) of the recording and reproducing apparatus 6 and reproducing the image data recorded on the recording medium.

A fade effect selection switch 7 is a switch for selecting an arbitrary fade function from a plurality of fade functions. A fade function ON/OFF switch 8 is an ON/OFF switch for turning ON or OFF the fade function selected by the fade function selection switch 7. A monitor 9 is a liquid crystal monitor to which synthesized the recorded or reproduced image data and fade are output. An external output 10 is an external output circuit for outputting the recorded or reproduced image on a television and the like.

Figure 2:
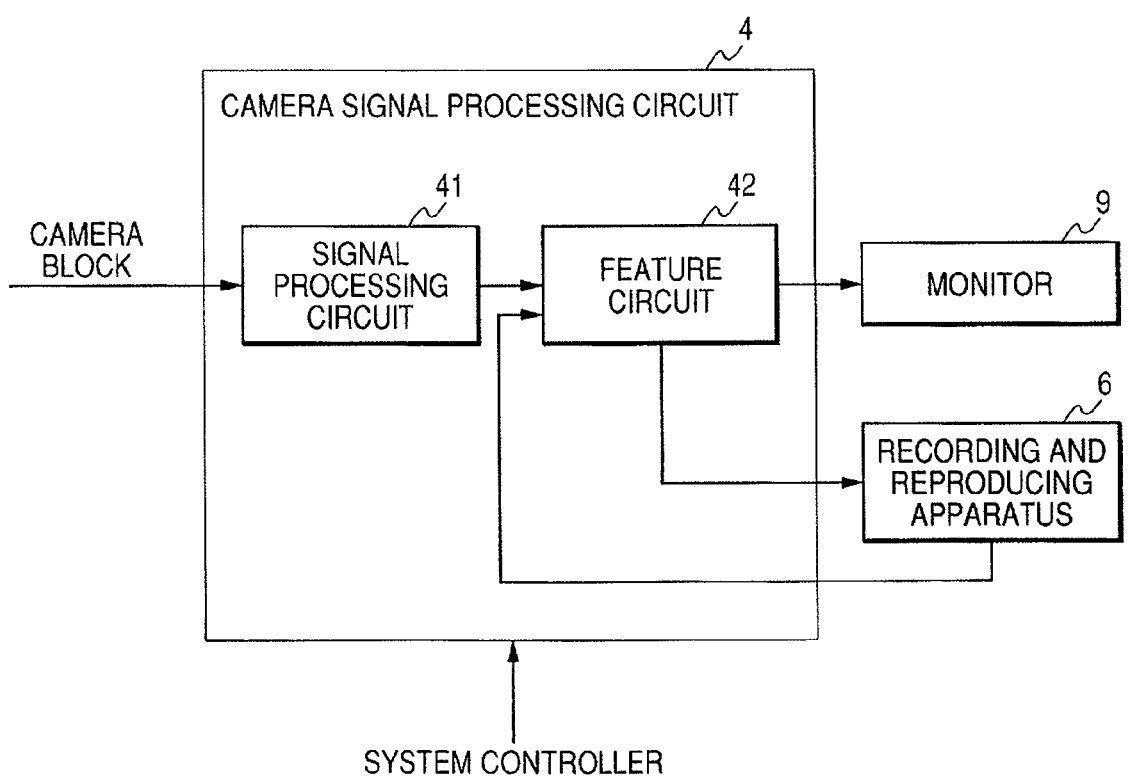
FIG. 2 is a block diagram showing a configuration example of a camera signal processing circuit.

A process of synthesizing the fade effect to the photographed image data will now be explained using the block diagram of the signal processing circuit 41 of FIG. 2.

The light that has passed through the lens 1 is converted by the image pickup element CCD 2 and the output image signal is input to the pre-process circuit 3. The input image signal is subjected to sampling/holding, AGC (Auto Gain Control), and AD conversion at the pre-process circuit 3, and thus converted to the digital image data. The digitalized image data is then input to the signal processing circuit 41 and subjected to various signal processes such as AWB (Auto White Balance) process, gamma correction and the like. In a feature circuit 42, a synthesized image in which a predetermined fade process is performed on the input photographed image data is generated. The fade-processed image which is being output from image pickup element (through image) is transferred to a display block and a recording and reproducing apparatus, and recorded on the recording medium. The through image synthesized with the fade effect is also displayed on the monitor 9.

Even when synthesizing the fade effect on the photographed image data not only during photographing but also during reproduction, the feature circuit 42 performs similar processes as above. That is, the reproduced image data read from the recording medium (not shown) included in the recording and reproducing apparatus is input to the feature circuit 42 and subjected to a predetermined fade process. The synthesized image data subjected to the fade process is then displayed on the monitor 9 or output to the external display apparatus such as television from the external output 10.

The operation example of the system controller 5 in the fade process (fade-out effect will be explained by way of example) during the normal photograph recording will now be explained with reference to FIG. 5.

When the power is turned on, the system controller 5 starts the process from step S300. The processes from step S300 to step S312 are repeatedly performed at a constant period while the power is turned on.

The process proceeds from step S300 to the next step S301, where determination of whether it is a fade selection completion waiting state in which the arbitrary fade effect is selectable from the menu screen of fade function during photograph recording, is made. When not in the fade selection completion waiting state as a result of the determination, the process proceeds to step S312 and the current process is ended without performing any process.

When in the fade selection completion waiting state as a result of the determination of step S301, the process proceeds to step S302 where determination of whether the fade function is turned ON or not is made. When the fade function is turned ON as a result of such determination, the process proceeds to step S303. If the fade function is turned OFF, the process proceeds to step S312 and the present process is ended.

In step S303, determination of whether the fade level counter is counting or not is made. If the fade level counter is counting, as a result of the determination, the process proceeds to step S309 and if the fade level counter is not counting, the process proceeds to step S304.

In step S304, determination of whether the Record (REC) button is depressed once, that is, whether recordation is started or not is made, and if not depressed, the process proceeds to step S312 and the present process is ended. If the REC button is depressed, as a result of the determination of step S304, the process proceeds to step S305 in a recording started state. In this step, the fade level counter is counted up, and the fade process of synthesizing the fade effect onto the input image is performed. The process then proceeds to step S306.

In step S306, determination of whether the fade level counter is greater than or equal to "a predetermined value X" is made. If the fade level counter is smaller than or equal to X, as a result of the determination, the process proceeds to step S312 and the present process is ended. If the fade level counter is greater than X as a result of the determination of step S306, the fade-out effect is applied over a predetermined time by the counter. The process then proceeds to step S307 where the fade level counter is initialized (0×00), and then proceeds to step S308 where the fade function is turned OFF. Thereafter, the process proceeds to step S312, and the present process is ended.

In step S309, determination of whether or not the REC button is depressed again is made. If the REC button is not depressed again, the processes from step S305 to step S308 are performed as explained above, the fade-out process is performed over a predetermined time, and the process then proceeds to step S312 and the present process is ended.

If it is determined that the REC button is depressed, as a result of the determination of step S309, since recordation is stopped halfway, the process proceeds to step S310 where the fade level counter is initialized (0×00). Thereafter, the process proceeds to step S311 where the fade function is turned OFF. Subsequently, the process proceeds to step S312 and the present process is ended.

Although FIGS. 3A and 3B explain the processing procedures of fade-out, fade-in is achieved by counting down the fade level counter to below "initial value X". Further, the above mentioned fade level counter is a counter for synchronizing the level of the fade effect with a counter value and varying the same by incrementing or decrementing the counter for every constant period.

Conventionally, as mentioned above, since the photographer could not find out what kind of operation the selected fade effect is, until the fade selection operation of step S301, the fade ON operation of step S302, and the REC button depression operation of step S304 are implemented and the image synthesized with the fade effect and recorded was checked, it will take a plurality of operations and much time until photograph recording with the desired fade effect can be started. This is the problem of the prior art.

The present embodiment will now be explained.

The operation of the system controller 5 of a feature of the present embodiment will now be explained using the flow charts of FIGS. 3A and 3B.

Figures 3, 3A:
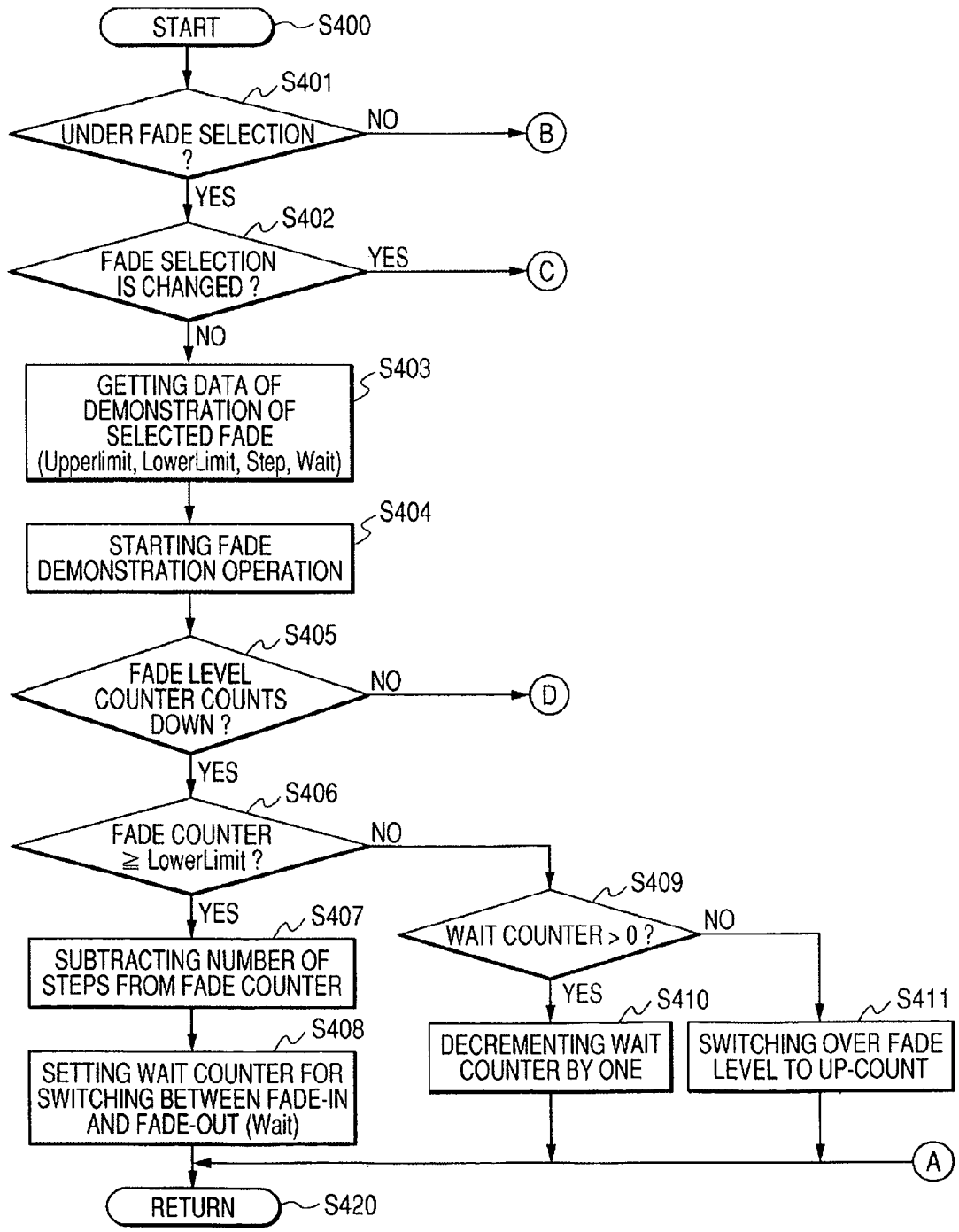
FIG. 3 is comprised of FIGS. 3A and 3B showing flow charts explaining the operation of a system controller according to the present embodiment.
Figure 3B:
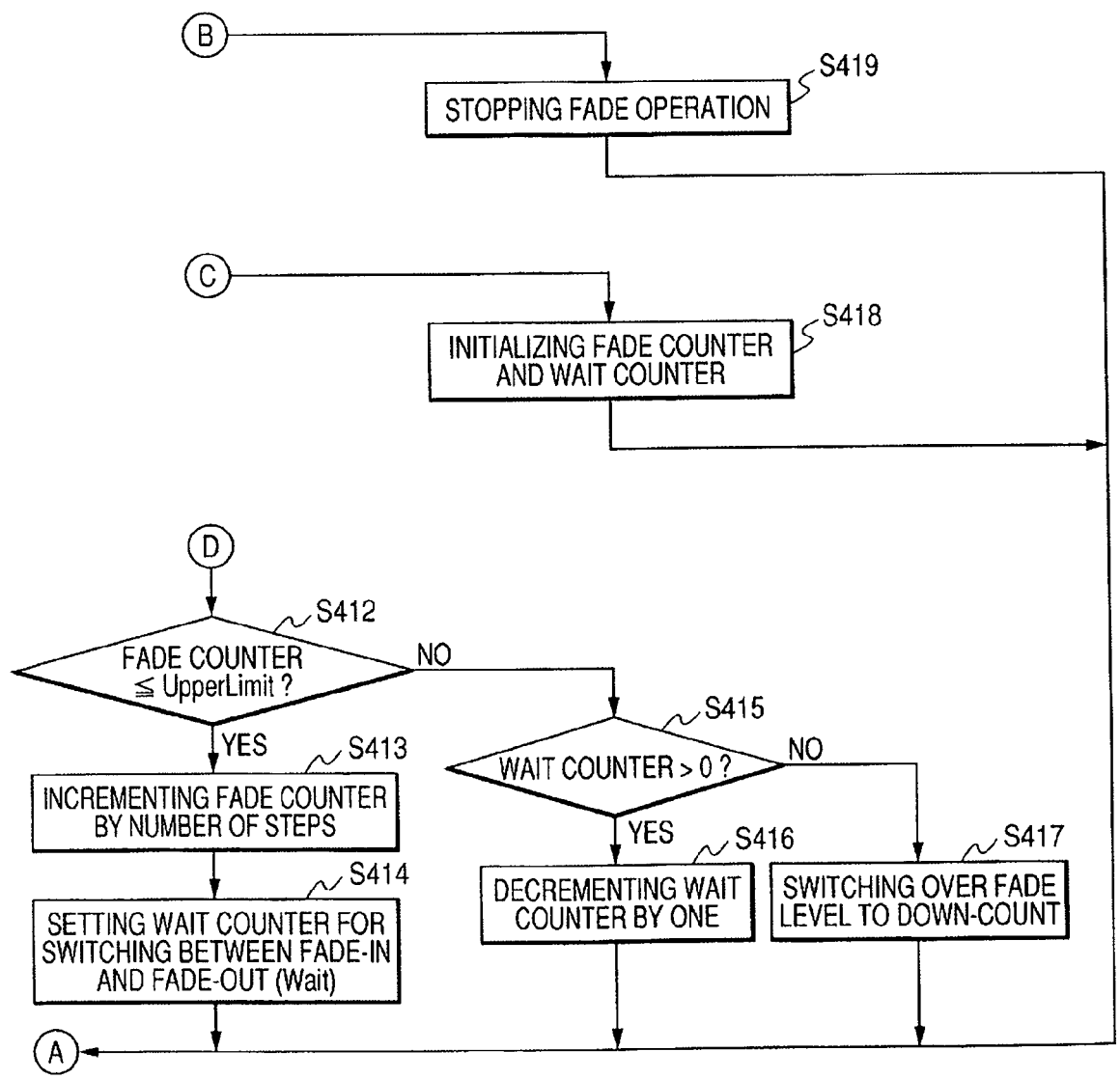

As shown in FIGS. 3A and 3B, the system controller 5 starts the processes from step S400 when the power is turned on. The processes from step S400 to step S420 are repeatedly performed at a constant period while the power of the image pickup apparatus is turned on.

The process then proceeds from step S400 to the next step S401 where determination of whether under fade effect selection or not is made. When not under fade effect selection as a result of the determination, the process proceeds to step S419 where the fade demonstration operation is stopped, and thereafter, proceeds to step S420 where the present process is ended. When an arbitrary fade effect is selected when the photographed image is in recording or in reproduction and the selected fade effect is decided by a decision button and the like, the fade demonstration process is ended and then moved on to photograph recording or reproducing process. The fade demonstration operation is an operation that repeats either the fade-in or the fade-out at a time shorter than the fade actual recording and performs a predetermined wait when switching between fade-in and fade-out.

When under fade selection as a result of the determination of step S401, the process proceeds to step S402 where determination of whether the fade selection is changed or not is made. When the fade selection is changed as a result of the determination of step S402, the process proceeds to step S418 where the fade demonstration level counter and the wait counter are initialized, and thereafter, the process proceeds to step S420 where the present process is ended.

If, on the other hand, the fade selection is not changed as a result of the determination of step S402, the process proceeds to step S403, and the data of demonstration of the selected fade are retrieved. The retrieved data are the upper limit counter limit value (Upper limit), the lower limit counter limit value (Lower limit), the counter step, and the wait for switching between fade-out and fade-in, for comparison with the fade level counter.

The process then proceeds to step S404 where the fade demonstration operation is started. Next, the process proceeds to step S405, and determination is made whether the fade level counter is counting down or not. If the fade level counter is not counting down as a result of the determination, the process proceeds to step S412 and when counting down in step S405, the process proceeds to step S406.

As a result of the determination of step S406, determination of whether the fade level counter is greater than the lower limit counter limit value is made, and if greater than the lower limit counter limit value, the process proceeds to step S407 where number of counted steps is subtracted from the fade level counter. The process then proceeds to step S408 where the wait counter for switching between fade-in and fade-out is set. The process then proceeds to step S420 and the present process is ended.

If the fade level counter is smaller than or equal to the limit counter limit value as a result of the determination of step S406, the process proceeds to step S409, and determination is made whether the wait counter is greater than "0".

If the wait counter is greater than "0" as a result of the determination of step S409, the process proceeds to step S410 where the wait counter is decremented by one. The process then proceeds to step S420 and the present process is ended.

If the wait counter is less than or equal to "0" as a result of the determination of step S409, the process proceeds to step S411 where the fade level is switched over to up-count. The process then proceeds to step S420 after step S411 and the present process is ended.

With regards to the operations up to this point, the number of steps is subtracted from the fade level counter until the fade level counter reaches the lower limit counter limit value, to perform the fade-in operation. When the fade level counter reaches the lower limit counter limit value, the fade level counter is maintained until the wait counter reaches "0", and then a predetermined wait operation is performed. After the wait operation is finished, the fade level counter is switched over to up-count.

If the fade level counter is not counting down that is, when counting up, as a result of the determination of step S405, the process proceeds to step S412 where determination is made whether the fade level counter is greater than the upper limit counter limit value.

If the fade level counter is smaller than the upper counter limit value as a result of the determination of step S412, the process proceeds to step S413 where the fade level counter is incremented by the number of steps and then proceeds to step S414 where setting of the wait counter for switching between fade-in and fade-out is performed. Thereafter, the process proceeds to step S420 and the present process is ended.

If the fade level counter is greater than or equal to the upper limit counter limit value as a result of the determination of step S412, the process proceeds to step S415 where determination is made whether the wait counter is greater than "0".

If the wait counter is greater than "0" as a result of the determination of step S415, the process proceeds to step S416 where the wait counter is decremented by one and then proceeds to step S420 where the present process is ended.

If the wait counter is less than or equal to "0" as a result of determination of step S415, the process proceeds to step S417, and the fade level counter is switched over to down-count. Thereafter, the process proceeds to step S420 and the present process is ended.

With regards to the operations up to this point, the fade level counter is incremented by number of steps until the fade level counter reaches the upper limit counter limit value, to perform the fade-out operation. When the fade level counter reaches the upper limit counter limit value, a predetermined wait operation is performed while maintaining the fade level counter until the wait counter reaches 0. When the wait operation is finished, the fade level counter is switched over to down-count.

As explained above, when under the fade selection state in the present embodiment, the fade level counter is subjected to the down-count to subtract number of steps for every predetermined period until lower limit counter limit. When the counter is less than or equal to the lower limit counter, wait for a predetermined wait counter time is switched over to up-count to add number of steps for every predetermined period until upper limit counter limit. When the counter is greater than or equal to the upper limit counter, the operations of waiting for a predetermined wait counter time, and switching over to down-count are repeated.

When changing the fade item during fade selection, that is, during the fade operation, the fade level counter and the wait counter are initialized in step S418, so that the fade operation starts from the initial state in the next selected fade. In this way, the fade effect can be checked by turning on the fade operation during the fade selection, and thus it becomes possible to instantaneously determine which fade to use.

In the above described embodiment, fade-in and fade-out of the fade effect are repeated, but when one of them is selected as the fade effect, the operations from the start to the end of the selected fade may be automatically repeated.

Figure 4A:
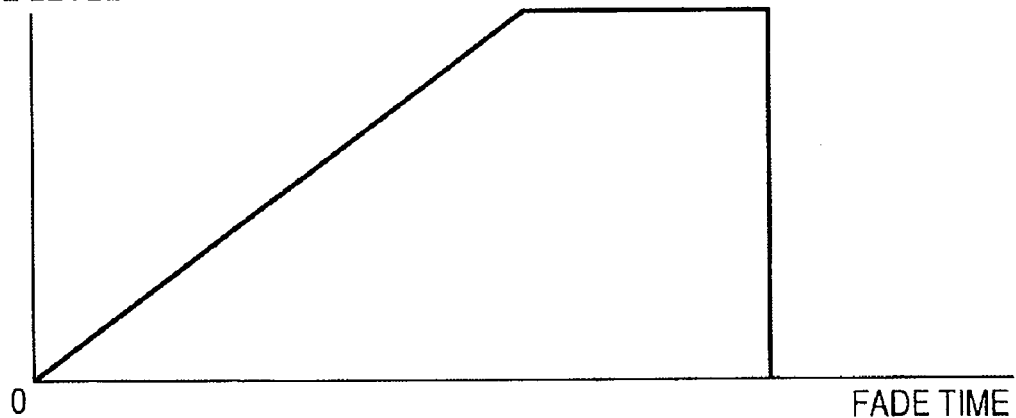
FIGS. 4A and 4B are characteristic diagrams showing the fade operation during recording and the fade demonstration operation according to the present embodiment.
Figure 4B:
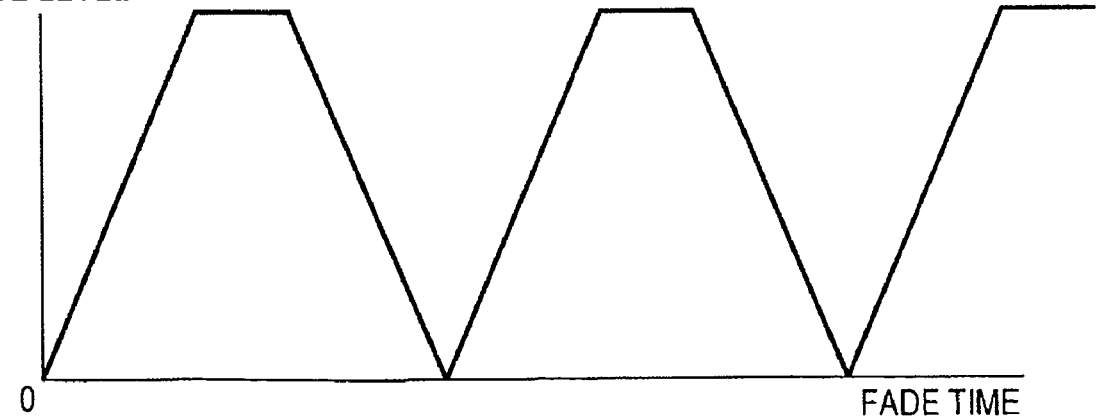

The difference between the fade operation during recording and the fade operation according to the present embodiment is shown in the characteristic diagram of FIG. 4A and FIG. 4B. In the fade synthesizing image operation during recording of FIG. 4A, the fade effect selected during photographing is synthesized to be recorded on tape. By performing the operation similar to the actual fade operation without loading the tape, the fade operation currently being selected can be checked.

However, the fade effect must actually be synthesized and recorded before checking the operation of the fade currently being selected, and the operation cannot be checked before recording. Further, even when performing operation without loading the tape, it must be checked at the actual time of the fade process through several operations, and therefore it takes a very long time until the photographer finds the fade operation that he/she desires to use.

In fade demonstration according to the present embodiment of FIG. 4B, the fade operation is automatically repeated during fade selection, and thus the photographer is able to see the digest of a time shorter than the actual time of the operation of a plurality of fade effects and can instantaneously select the desired fade effect by simply switching the fade function selection switch 7.

When an arbitrary fade effect is selected with the fade effect selection switch 7, if controlled so that the lower limit counter limit value and the upper limit counter limit value of the most characteristic scene of the selected fade operation are selected, the fade effect is more easily recognized by the photographer. The lower limit counter limit value and the upper limit counter limit value of the most characteristic scene are different for each fade effect and thus is formed into a table and stored in a memory (not shown) of the system controller 5.

During reproduction, the reproducing image data read from the recording medium (not shown) included in the recording and reproducing apparatus is input to the feature circuit 42 and subjected to a predetermined fade process. The synthesized image data subjected to the fade process is displayed on the monitor 9 or output to the external display device such as television from the external output 10.

When the fade effect is selected during reproduction, the still image of when the reproduction is being paused is input to the feature circuit. Thus, even in the fade processing during reproduction, the fade effect can be checked without a case where the video image was forwarded when the selection of the fade is canceled with the fade demonstration during selection.

Other Embodiments of the Present Invention

The fade effect as an example of the image effect, is an effect provided when a screen is switched over to another screen, and includes wipe-in, puzzle, corner (wipe), zigzag, flip and the like.

Each means configuring the image pickup apparatus according to the embodiment of the present invention and each step of the imaging method are executed by operating the program stored in a RAM, a ROM and the like of the computer. The present invention further includes program and computer readable storage medium on where the program is recorded.

The present invention may be applied as for example, system, apparatus, method, program, or storage medium, more specifically may be applied to a system configured by a plurality of equipments or may be applied to an apparatus made up of one equipment.

The present invention also includes a case in which it is accomplished by directly or remotely providing the program (program corresponding to the flow charts shown in FIGS. 3A and 3B in the embodiment) of the software for realizing the function of the above mentioned embodiment to a system or an apparatus, and reading and executing the provided program code by the computer of the system or the apparatus.

Therefore, in order to achieve the functional process of the present invention with a computer, the program code itself installed in the computer also realizes the present invention. That is, the present invention includes the computer program itself for realizing the functional process of the present invention.

In this case, as long as the function of the program is included, it may take any form including object code, program executed by an interpreter, script data provided to the OS and the like.

The recording medium for providing the program includes for example, a floppy (registered trademark) disc, a hard disc, an optical disc, a magneto-optical disc, an MO, a CD-ROM, a CD-R, a CD-RW, a magnetic tape, a non-volatile memory card, a ROM, a DVD (a DVD-ROM, a DVD-R) and the like.

In addition, in a method of providing the program, the program may be provided by connecting to the web page of an internet using a browser of a client computer, and downloading the computer program itself or the file compressed and containing the automatic install feature of the present invention from the web page to a recording medium such as a hard disc.

The program code configuring the program of the present invention may be divided into a plurality of files, and each file may be downloaded from a different web page. That is, the present invention also includes WWW server for downloading the program file to realize the functional process of the present invention with a computer.

Further, the program of the present invention is encrypted and stored in a recording medium such as a CD-ROM and distributed to the user, and allows the user who has met a predetermined condition to download the key information for decrypting the encryption from the web page by way of the internet, and to execute the encrypted program by using the key information and install the same to the computer.

When the computer executes the read program, the function of the above mentioned embodiment is realized, and further, based on the instruction of the program, the OS operating on the computer and the like, performs a part of or all of the actual process, which process also realizes the function of the above mentioned embodiment.

After the program read from the recording medium is written to the memory arranged in a function expansion board inserted to the computer or the function expansion unit connected to the computer, based on the instruction of the program, the CPU and the like of the function expansion board or the function expansion unit performs a part of or all of the actual processes, which process also realizes the function of the above mentioned embodiment.

The present invention is not limited to the above embodiments and various changes and modifications can be made within the spirit and scope of the present invention. Therefore to apprise the public of the scope of the present invention, the following claims are made.

This application claims priority from Japanese Patent Application No. 2004-374767 filed on Dec. 24, 2004, which is hereby incorporated by reference herein.

What is claimed is:

1. An image pickup apparatus comprising:
   image input unit which inputs an image;
   image effect selection unit which selects an arbitrary image effect, the image effect providing image synthesization which changes gradually in accordance with time elapsing;

synthesized image generation unit which generates a synthesized image in which the selected image effect is synthesized to the image input by the image input unit;

discrimination unit which discriminates whether the image effect selection unit remains selecting the same image effect and being capable of still changing the selected image effect; and controlling unit which, if the discrimination unit discriminates that the image effect selection unit remains selecting the same image effect and being capable of still changing the selected image effect, controls the synthesized image generation unit so as to automatically and repeatedly perform and display the synthesization operation of the same image effect of the input image, at a speed higher than that of a normal synthesization operation, wherein if the selection of the image effect by the image effect selection unit is decided, the controlling unit controls the synthesized image generation unit such that the synthesization operation repeatedly performed at the speed higher than the normal synthesization operation is stopped and the synthesization operation of the same image effect is performed not repeatedly on the image input by the image input unit at a speed of the normal synthesization operation.

2. The image pickup apparatus according to claim 1, wherein during the period of selection of the image effect by the image effect selection unit, the controlling unit repeatedly displays a synthesized image of a characteristic portion of the operation of the image effect.

3. The image pickup apparatus according to claim 1, wherein operation executing time of the image effect when selecting the image effect by the image effect selection unit is shorter than executing time after the selection of the image effect is decided.

4. The image pickup apparatus according to claim 1, wherein when selecting an arbitrary image effect from a plurality of different image effects by the image effect selection unit, executing times of the different image effects differs from each other.

5. The image pickup apparatus according to claim 1, wherein the image effect is a fade effect including at least one of fade-in and fade-out.

6. The image pickup apparatus according to claim 1, wherein one of fade-in and fade-out is alternately repeated at a constant period when selecting the fade effect including fade-in or fade-out by the image effect selection unit.

7. The image pickup apparatus according to claim 5, wherein the fade executing time of fade-in or fade-out of when selecting the fade effect by the image effect selection unit is shorter than the executing time of the fade effect after the selection of the fade effect is decided.

8. The image pickup apparatus according to claim 6, wherein wait of a constant time is performed while maintaining a fade level when switching between fade-in and fade-out, when selecting the fade effect by the image effect selection unit.

9. The image pickup apparatus according to claim 5, wherein when selecting an arbitrary fade effect from a plurality of different fade effects by the image effect selection unit, the fade operation executing time of the different fade effects differs from each other.

10. The image pickup apparatus according to claim 5, wherein when selecting the fade effect by the image effect selection unit, fade start level and fade end level are different for each fade effect.

11. The image pickup apparatus according to claim 5, wherein when switching over to another fade effect when selecting the fade effect with the image effect selection unit, the fade operation starts from an initial state of fade-out or fade-in.

12. The image pickup apparatus according to claim 1, wherein the image input unit inputs an image output from an image pickup element.

13. The image pickup apparatus according to claim 1, wherein the image input unit inputs a reproduced image read out from a recording medium.

14. The image pickup apparatus according to claim 13, wherein the image input unit inputs an image of when reproduction of image is paused.

15. A method of controlling an image pickup apparatus comprising:

an image input step for inputting an image;

an image effect selection step for selecting an arbitrary image effect, the image effect providing image synthesization which changes gradually in accordance with time elapsing;

a synthesized image generation step for generating a synthesized image in which the selected image effect is synthesized to the image input in the image input step;

a discrimination step of discriminating whether the image effect selection step remains selecting the same image effect and being capable of still changing the selected image effect; and a controlling step for, if the discrimination step discriminates that the image effect selection step remains selecting the same image effect and being capable of still changing the selected image effect, controlling the synthesized image generation step so as to automatically and repeatedly perform and display the synthesization operation of the same image effect of the input image, at a speed higher than that of a normal synthesization operation, wherein if the selection of the image effect in the image effect selection step is decided, the controlling step controls the synthesized image generation step such that the synthesization operation repeatedly performed at the speed higher than the normal synthesization operation is stopped and the synthesization operation of the same image effect is performed not repeatedly on the image input in the image input step at a speed of the normal synthesization operation.

16. A computer program stored in a computer-readable recording medium, comprising a program code for causing a computer to execute a method of controlling an image pickup apparatus, the method comprising:

an image input step for inputting an image;

an image effect selection step for selecting an arbitrary image effect, the image effect providing image synthesization which changes gradually in accordance with time elapsing;

a synthesized image generation step for generating a synthesized image in which the selected image effect is synthesized to the image input in the image input step;

a discrimination step of discriminating whether the image effect selection step remains selecting the same image effect and being capable of still changing the selected image effect; and a controlling step for, if the discrimination step discriminates that the image effect selection step remains selecting the same image effect and being capable of still changing the selected image effect, controlling the synthesized image generation step so as to automatically and repeatedly perform and display the synthesization operation of the same image effect of the input image, at a speed higher than that of a normal synthesization operation, wherein if the selection of the image effect in the image effect selection step is decided, the controlling step controls the synthesized image generation step such that the synthesization operation repeatedly performed at the speed higher than the normal synthesization operation is stopped and the synthesization operation of the same image effect is performed not repeatedly on the image input in the image input step at a speed of the normal synthesization operation.

17. A recording medium which computer-readably records the computer program set out in claim 16.

* * * * *